United States Patent Office 2,803,671
Patented Aug. 20, 1957

2,803,671
ALCOHOLS DERIVED FROM SAFFLOWER SEED OIL

Glenn R. Wilson, Detroit, Mich., assignor to Ethyl Corporation, New York, N. Y., a corporation of Delaware No Drawing. Application December 2, 1953,
Serial No. 395,838

3 Claims. (Cl. 260—632)

This invention pertains to a novel composition of matter and the production thereof, and in particular is concerned with a novel mixture of alcohols derived from safflower seed oil.

Safflower seed oil has been known for many years and used in paints and varnishes primarily in foreign countries. In recent years, increased investigation and production of safflower has been undertaken in this and foreign countries, and consequently its oil is finding increased and extensive use in many fields. The oil is generally obtained by first decorticating the seed. In this manner the shell is removed from the kernel. The kernel is then subjected to either an expression operation or extraction in order to obtain the oil. The oil thus obtained has been used primarily in the paint and varnish industry as a drying agent. Normally, subsequent treatments of the oil have not been made. The material was found to be relatively satisfactory for particular uses up to this time. As a result of my work in this field, I have found that a novel composition having many additional and diverse uses can be obtained from the safflower seed oil.

It is an object therefore of this invention to provide a new and novel composition of matter. A further object of this invention is to provide a mixture of alcohols derived from safflower seed oil. A still further object of this invention is to provide a process for preparing these novel alcohol mixtures. Other objects of this invention will become apparent from the discussion hereinafter.

The novel composition of this invention is a mixture of alcohols corresponding in the number of carbon atoms to the fatty acid radicals of safflower seed oil. The novel composition of this invention is obtained when safflower seed oil is reduced by an alkali metal-reducing alcohol process. The mixture of alcohols of this invention is characterized in that the unsaturation of the original safflower seed oil is retained when using an alkali metal-alcohol reduction process. This property is highly desirable for particular uses of the mixture. Thus, this invention provides a mixture of alcohols having properties for various uses as in drying oils and the like, as further discussed hereinafter.

The raw material from which the novel composition of this invention is obtained will vary somewhat in analysis. It is to be understood that the mixture of alcohols of this invention includes those obtained by a reduction process when treating the raw oil, and also oil which has been refined in various ways such as, for example, deacidification and the like. A typical analysis of safflower seed oil is as follows:

| | Percent |
|---|---|
| Unsaturated fatty acid constituents | 91.4 |
|    Oleic | 16.7 |
|    Linoleic | 71.3 |
|    Linolenic | 3.4 |
| Saturated fatty acid constituents ($C_{14}$, $C_{16}$, $C_{18}$, $C_{20}$, $C_{24}$) | 8.6 |
| Saponification number | 191.4 |
| Iodine number | 145.7 |
| Acid number | 0.6 |
| Ester number | 190.8 |

Safflower seed oil comprises primarily triglycerides of the fatty acids. Therefore, the fatty acid constituent percentages above are percentages of the total fatty acid portion of the triglycerides. The fatty acid portion of the triglycerides consists essentially of $C_{18}$ fatty acid radicals, both saturated and unsaturated, and minor proportions of other fatty acid radicals varying from $C_{14}$ to about $C_{24}$ carbon atoms.

The novel composition of this invention is the mixture of alcohols obtained when reducing a raw material such as typified above. The mixture of alcohols will vary corresponding to the variance in analysis of the starting material. However, the analysis of this new and novel composition will comprise at least a weight percent hydroxyl of 5.0, a Wijs iodine number of at least 140, an acid number not greater than 3.0, and a saponification number not greater than 5.0. In most instances the iodine number will be about 160 or greater. Thus, the novel mixture of this invention possesses even greater drying qualities than the original safflower seed esters. The number of carbon atoms of the individual alcohols of the mixture will correspond to the number of carbon atoms of the fatty acid portion of the starting material, with very little, if any, change in unsaturation. Thus, it can be seen that the mixture of alcohols obtained has a very high degree of unsaturation and can be applied to many diverse uses.

As mentioned above, the novel composition of this invention is produced by treating safflower seed oil simultaneously with an alkali metal and a reducing alcohol. Briefly, the process involves reacting the fatty acid esters with an alkali metal and a reducing alcohol, hydrolyzing the alkali metal alcoholates thus formed, and separating the high molecular weight alcohols from the reducing alcohol, caustic, solvent and glycerol when the triglycerides are reduced. In a typical process, but by no means limiting, between about the stoichiometric equivalent amount and 5 percent excess of the alkali metal is employed over that required to produce the corresponding alcoholates. Similarly, between about the stoichiometric equivalent amount and 5 percent excess of a reducing alcohol is employed over the theoretical requirement. The alcoholates formed are hydrolyzed by treating with water and the product alcohols are separated therefrom. The chemical reactions involved can be depicted as follows:

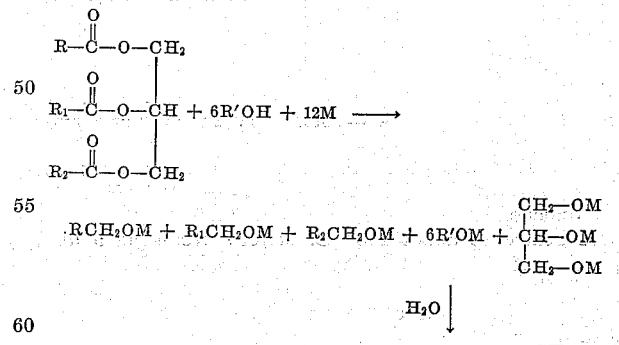

where R, $R_1$, and $R_2$ can be the same or different and are carbon chains having about 14 to 24 carbon atoms, R' is an alkyl radical, and M is an alkali metal.

In carrying out the above reactions to prepare the alcohol mixture of this invention, a preferred method is to utilize the alkali metal in the form of subdivided particles. Alkali metal dispersions, which are well known in the art, are well suited for this purpose. These dispersions are prepared by melting the alkali metal in an inert organic medium which generally has a boiling point above the melting point of the alkali metal. During this operation the mixture is highly agitated in order to form the dispersion. Various dispersion mediums are well known in the art and can be employed in preparing the alkali metal dispersions. Among such mediums are for example, toluene, xylene, dihydronaphthalene, petroleum fractions, heavy alkylates, and the like. Still other dispersion mediums can be employed, the foregoing serving merely as illustrative examples. The proportion of the alkali metal to the dispersion medium can be varied, and dispersions having metal concentrations from about trace quantities to about 60 percent by weight are common. It is preferred to utilize about a 50 percent by weight dispersion. Likewise, the particle size will vary and generally the solution will have particles averaging about 50 microns in size and smaller. It is preferred that the particle size average less than about 20 microns. Smaller particle sizes enhance the reaction rate and provide increased contact between the metal and the safflower oil and reducing alcohol. Although any of the alkali metals can be employed, sodium is preferred here, primarily because of its greater availability and economy.

The reducing alcohols employed when producing the composition of this invention can be the primary, secondary, and tertiary alcohols. For example, lower molecular weight primary, secondary, or tertiary alcohols, such as those having less than about 10 carbon atoms, can be used. Likewise, the alcohols produced by such a process can be employed as reducing alcohols, and this includes alcohols having from about 10 to 30 carbon atoms. However, it is preferred to utilize the secondary alcohols inasmuch as it has been found that they are less reactive toward the alkali metal and are quite suitable for use in ester reduction processes. Among such secondary alcohols are for example, propanol-2, butanol-2, pentanol-2, pentanol-3, methylisobutylcarbinol, 2-methyl butanol-3, hexanol-2, hexanol-3, phenylmethyl carbinol, phenylethyl carbinol, cyclopentanol, and cyclohexanol. Still other secondary alcohols can be employed, the foregoing serving merely as illustrative examples.

The solvent used in this process can be any solvent which is unreactive with the particular reactants of the process. In a preferred embodiment, the solvent which is employed is the same organic material utilized in the preparation of the alkali metal dispersion. However, other materials can be used to equal advantage. The proportion of the solvent employed can vary within wide limits. The proportion of solvent to ester can be between the limits of 0.25 and 5.0 to 1, and, preferably, between 0.25 and 1.3 to 1 part by weight.

To further demonstrate the novel composition of this invention and a process for its manufacture, reference is made to the following example wherein all parts and percentages are by weight.

To a vessel equipped with external heating and a means for agitation was added 66 parts of sodium and 173 parts of toluene. This mixture was then vigorously agitated and heated to about 110° C. thereby producing a dispersion of sodium. A mixture of 200 parts of safflower seed oil and 149 parts of methylisobutylcarbinol was dissolved in 173 parts of toluene. The safflower seed oil had the following analysis: saponification number, 191.4; acid number, 0.6; ester number, 190.8; iodine number 145.7; and percent hydroxyl, 0. This mixture was added to the sodium dispersion at a rate sufficient to maintain a reflux of the reaction mixture. When the total mixture had been added to the dispersion, the reaction was allowed to continue at reflux temperature for about 30 minutes. The reaction mixture was then hydrolyzed with about 570 parts of water in order to convert the alcoholates to the alcohols. The resulting mixture separated into an organic and aqueous phase, and the lower aqueous phase was discharged. The organic layer was again washed with about 200 parts of water in order to bring the solution to a pH of about 7.0. This organic layer was then distilled under reduced pressure to remove the toluene and methylisobutylcarbinol. The yield of the mixture of alcohols obtained was 93.3 percent, 169.6 parts, and the analysis of this product was: saponification number, 3.5; acid number, 1.3; iodine number, 193.4; percent hydroxyl, 6.5. The iodine number was determined by the ordinary Wijs method.

The novel composition of this invention can be prepared by similar methods of ester reduction other than the particular mode or sequence of operations described in the preceding example. It is to be understood that the specific proportions disclosed here are merely illustrative and can be varied within wide limits. Similarly, by-products such as glycerine and caustic can be recovered for their values. Ordinarily the solvent and reducing alcohol will be recycled for reuse in the process.

Other variations in the over-all ester reduction process can be made. It has been found that the raw safflower seed oil can be first transesterified, preferably with an alcohol corresponding to the reducing alcohol. A preferred method of transesterifying the glyceride esters is to react them with an aliphatic alcohol in the presence of an alkaline alcoholysis catalyst. In this manner, the glycerine is separated prior to the actual ester reduction operation and is replaced by the esterifying alcohol. In this instance, a secondary alcohol is again preferred, such as for example, methylisobutylcarbinol and the like. The newly formed esters are then reduced similar to the process as indicated above. The chemical reactions are essentially the same with exception that monoesters will be reduced rather than triglycerides and the proportion of reactants will vary accordingly. A particular advantage of this technique is that glycerine yield is greater.

The novel composition of this invention can be applied to a variety of uses. When the mixture of alcohols are sulfated or sulfonated, improved alkyl sulfate and sulfonate detergents, wetting agents, emulsifiers, and the like are produced. In some instances, the sulfating or sulfonating agent may react with some of the unsaturated portions of the mixture. Likewise, various sulfation techniques can be employed which selectively sulfate only the hydroxyl radical of the alcohols of this invention. The salts of these products can be formulated with other sulfonated products, such as dodecylbenzene sulfonic acid, with amides, inorganic phosphates and sulfates, and the like constituents of synthetic detergent compositions.

Another use for the composition of this invention is as a drying oil in the paint and varnish industries. The product of this invention is more highly refined and suitable than the crude safflower seed oil for use in paint formulations. Because of the higher degree of unsaturation of the product of this invention, it possesses greater drying qualities than other drying oils such as, for example, linseed oil and the like. One reason for the improved drying qualities of the mixture of alcohols of this invention is that it has a lesser percentage of non-drying constituents than other drying oils.

A still further use for the novel composition of this invention comprises additives and additive intermediates for lubricants. Thus, for example, when the mixture of alcohols of this invention or its derivatives such as, for example, esters, metal salts, and the like, is added to mineral lubricating oils, it will enhance their lubricant properties. Likewise, when the sulfated and sulfonate derivatives, as mentioned above, of the mixture of alcohols are employed in the lubricating oils, improved lubricants are obtained.

The novel mixture of alcohols of this invention is also admirably suited as an intermediate for the production of other useful organic chemicals or mixtures thereof. For example, the double bonds of the unsaturated constituents can be subjected to any of the known reactions of double bonds to produce compounds such as epoxides halogenation derivatives, and the like. Further, the alcohols can be reacted with various acids to produce the corresponding esters. Likewise, they may be oxidized to produce the corresponding aldehydes and acids. Since the majority of the unsaturates of the mixture contain at least two double bonds, the mixture can be subjected to isomerization conditions in order to produce conjugated unsaturation compounds. These compounds can then be utilized to produce various polymerization products. A still further use of the novel composition of this invention is that it, and its ester and ether derivatives can be employed as a plasticizer composition. Additionally, when the novel mixture of alcohols of this invention is fractionated, as for example, into a fraction containing lower molecule weight alcohols and a fraction containing the higher alcohols, these fractions can be employed in the foregoing uses and others. These and many other uses will be apparent to those skilled in the art.

Having thus described the novel composition of this invention and a process for its manufacture, it is not intended that it be limited except as noted and prescribed in the following claims.

I claim:

1. A new composition of matter consisting essentially of the mixture of high molecular weight alcohols corresponding to the acids present in safflower seed oil and derived from safflower seed oil, by reduction with an alkali metal and a reducing alcohol, and hydrolysis of the reduction product.

2. As a new composition of matter, a mixture essentially of higher molecular alcohols corresponding in the number of carbon atoms and degree of unsaturation to the fatty acid radicals and in substantially the same relative percentages as are the fatty acid radicals of safflower seed oil.

3. As a new composition of matter a mixture essentially of higher molecular alcohols derived from safflower seed oil, said alcohols corresponding in the number of carbon atoms and degree of unsaturation to, and being in substantially the same percentages as, the fatty acid radicals of safflower seed oil, said mixture having a saponification number of about 3.5, an acid number of about 1.3, an iodine number of about 193, and a percent hydroxyl of about 6.5.

References Cited in the file of this patent

UNITED STATES PATENTS

| | | |
|---|---|---|
| 2,104,803 | Henke et al. | Jan. 11, 1938 |
| 2,579,257 | Hansley | Dec. 18, 1951 |
| 2,607,806 | Bigot | Aug. 19, 1952 |
| 2,647,932 | Blinka et al. | Aug. 4, 1953 |

OTHER REFERENCES

Jamieson: Vegetable Fats and Oils, pp. 297 to 299, 2nd ed., 1943.

Hilditch: "Industrial Fats and Waxes," Balliere, Tindall & Cox, London, 1949, pp. 138–41, 177, 178, 563–7.

Miner et al.: "Glycerol," Reinhold, N. Y., 1953; pp. 71–6.

Lange: "Handbook of Chemistry," Handbook Publ., Sandusky, Ohio, pp. 738–44.